United States Patent
Joshi et al.

(10) Patent No.: US 6,210,151 B1
(45) Date of Patent: Apr. 3, 2001

(54) SELF-COOLED OXYGEN-FUEL BURNER FOR USE IN HIGH-TEMPERATURE AND HIGH-PARTICULATE FURNACES

(75) Inventors: Mahendra L. Joshi, Darien; Harley A. Borders, Lombard; Ovidiu Marin, Lisle; Olivier Charon, Chicago, all of IL (US)

(73) Assignees: American Air Liquide, Walnut Creek, CA (US); L'Arr Liquide Societe Anonyme pour l'Etude et, l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 09/571,241

(22) Filed: May 16, 2000

Related U.S. Application Data

(63) Continuation of application No. 09/185,183, filed on Nov. 3, 1998.

(51) Int. Cl.[7] ........................................ F23D 14/24
(52) U.S. Cl. .............................. 431/8; 431/183; 431/185; 431/187
(58) Field of Search .................................. 431/159, 181, 431/183, 185, 187, 353, 8

(56) References Cited

U.S. PATENT DOCUMENTS

| | | |
|---|---|---|
| 1,731,722 | 10/1929 | Meier . |
| 3,809,525 * | 5/1974 | Wang et al. ................. 431/353 |
| 3,905,751 | 9/1975 | Hemsath et al. . |
| 4,125,359 | 11/1978 | Lempa . |
| 4,313,789 | 2/1982 | Frahme . |
| 4,451,230 * | 5/1984 | Bocci et al. ................. 431/183 |
| 5,346,390 | 9/1998 | Slavejkov et al. . |
| 5,433,600 * | 7/1995 | Jeng et al. ................. 431/183 |
| 5,449,286 | 9/1995 | Snyder et al. . |
| 5,454,712 * | 10/1995 | Yap ............................... 431/187 |
| 5,470,224 * | 11/1995 | Bortz ............................. 431/183 |
| 5,490,775 | 2/1996 | Joshi et al. . |
| 5,620,316 | 4/1997 | Duboudin et al. . |
| 5,772,427 * | 6/1998 | Laurenceau et al. ......... 431/181 |
| 5,814,125 | 9/1998 | Anderson et al. . |

OTHER PUBLICATIONS

Communication dated Sep. 14, 2000 from EPO transmitting European Search Report for 9940262121.9–2301.
Bloom Engineering Company, Inc. HTR® Burner High Thermal Release, Brochure, 1993.

* cited by examiner

Primary Examiner—Ira S. Lazarus
Assistant Examiner—Sara Clarke
(74) Attorney, Agent, or Firm—Jeffrey L. Wendt

(57) ABSTRACT

A self-cooled oxidant-fuel burner consisting novel fuel and oxidant nozzles and three compartment refractory burner block design is proposed. The new oxidant-fuel burner can fire in high-temperature (2200° F. to 3000° F.) and high-particulate (or high process volatiles/condensates) furnaces without over-heating or causing chemical corrosion damage to it's metallic burner nozzle and refractory burner block interior. Using various embodiments of nozzle and block shape, the burner can offer a traditional cylindrical flame or flat flame depending on the heating load requirements. The new features of this burner include unique fuel nozzle design for the streamline mixing of fuel and oxidant streams, a controlled swirl input to the oxidant flow for desired flame characteristics, a controlled expansion of flame envelope in the radial and axial dimensions, and efficient sweeping of burner block interior surface using oxidant to provide convective cooling and prevent any build up of process particulates. In addition, a relatively thick wall metallic nozzle construction with heat conduction fins enable efficient heat dissipation from the nozzle tip and providing a maintenance free burner operation.

5 Claims, 5 Drawing Sheets

SELF-COOLED OXYGEN-FUEL BURNER FOR USE IN HIGH-TEMPERATURE AND HIGH-PARTICULATE FURNACES

This application is a continuation of application Ser. No. 09/185,183, filed Nov. 3, 1998 (which is incorporated herein by reference in its entirety).

BACKGROUND OF THE INVENTION

1. Field of the Invention

This invention relates to combustion in general, and specifically to burners and methods of use of same to combust a fuel with an oxidant having an oxygen concentration greater than air.

2. Prior Art

In burner technology employing oxidants having oxygen concentration greater than the oxygen concentration in air, when such burners are used in glass manufacture, one object is to produce a luminous low temperature flame. Often these flames have low gas velocities and very simple (for example, pipe-in-pipe configuration) mixing strategy. Use of burner blocks having cylindrical combustion chambers is known, wherein the major process consists of a fuel-rich core surrounded by oxygen-rich sheath inside the cylindrical cavity. A cylindrical shape burner block (sometimes referred to as a precombustor) with a ratio of length "L" to diameter "D" of the cylindrical cavity between 2 and 6. In this L/D ratio range, the fuel and oxygen velocities (less than 600 ft/s) are chosen for firing ranges up to 20 MM Btu/hr. Here, the objective is to produce a long, lazy and high luminosity oxy-fuel flame using delayed mixing. The production of soot particles due to thermal cracking (in the fuel-rich core) and subsequent combustion provides the flame luminosity. Outside of the above L/D ratio range the flame acquires very high "axial" momentum and it becomes very non-luminous.

While such burners are useful for many purposes, there are disadvantages with such burners. The major disadvantage of such burner blocks is that the flame shape, especially maximum flame diameter and/or flame length, is always dictated by the burner block L/D ratio and fuel and oxidant velocities. The general flame characteristics are long, lazy and high luminosity flame without any significant component for convective heating, larger flame surface area for the increased load coverage, or considerations to reduce the effect of particulate "inspiration effect" near the hot surface of the burner block (recirculation zone). The axial momentum flame of such burners produce a low-pressure region due to the combustion.

The size and strength of above three dimensional recirculation zone is dependent on the momentum of the axial flame combustion products. The higher the flame momentum, the higher would be the inspiration effect of the recirculation zone, and higher would be the magnitude of low pressure region around the hot-face of the burner block.

The low pressure region in the vicinity of the burner block hot-face allows various process particulates (such as glass batch, volatiles, condensates, and the like) to deposit on the burner block hot-face, or sometimes even get pulled inside the burner block cavity (if there is a void between oxidant stream and burner block inner surface). This is very common if the burner block cavity is not designed to fill completely with flame gases. The objective to design a tight burner block without any void becomes very difficult when burner firing rate (amount of fuel and oxidant flows) is varied over a wide range. A slight gap in the burner block around the flame envelope can inspirate combustion products into the burner block cavity due to the presence of the low-pressure region and subsequent pumping action of the recirculation zone. The consequence of plugged burner block can result in increased frequency of maintenance (in terms of cleaning burner and/or block or lower burner/block life) or a catastrophic failure (meltdown of block/burner) due to direct or indirect impingement/deflection of high temperature flame.

Another disadvantage of pipe-in-pipe shape burner block design is the difficulty in producing a flame which is expanded in a radial direction generally perpendicular to the direction of fuel and oxidant gas flows, referred to herein as a "flat" flame. The cylindrical geometry pipe-in-pipe burners have no provision for expanding the flame to develop in the radial direction. The radial, flat flame shape is very common in air-fuel burners for heating a furnace interior with constant heat flux. A simple example is a steel reheat furnace where air-fuel burners are mounted on furnace roof (crown) and they radiate heat to the steel load (billets, plates) below. The advantage of a radially expanding flat flame (usually swirling) is to provide a very little axial heating component and most of the heat is due to radiation from the heated wall. The flat flame is found to hug the wall surface by a coanda effect and produce a heat-source for imparting a uniform radiation. This type of air-fuel burner is known by a tradename "Wall Hugger" in industry. The wall-hugging flame is created by the swirling of air at high velocity. However, the same process is not yet proven using oxy-fuel burners.

Swirling oxidant/fuel burners are known where the oxidant has an oxygen concentration greater than the concentration in air. Typically the burner block has a cylindrical cavity, with the burner recessed within a cylindrical cavity. High velocity fuel injection and swirling, low velocity oxygen injection in the annular space is provided. A swirl stabilized flame is formed within a constant diameter cylindrical block cavity. In this design there is no provision for expansion of diverging oxygen flow stream due to swirling oxygen motion. The resulting flame is a "narrow" cylindrical flame based on exit diameter D. The pipe shape combustion chamber coupled with a narrow exit geometry does not provide sufficient room for the flame to expand in the radial direction or in the extreme situation a formation of flat flame. The constant diameter geometry (pipe shape) negatively affects the maintenance of oxidant swirl due to wall friction. If a swirling fluid stream is not allowed to expand in the radial direction, the intensity of swirl quickly dies due to wall friction effects. On the other hand, the swirling oxidant also quickly reacts with the fuel due to the close proximity in the combustion chamber. This process creates a short intense flame. The cooling of the burner block is also negatively affected due to the quick burnout of swirling oxidant in a relatively narrow diameter burner block.

Further, the entire burner body (usually a metallic pipe) is inserted into the burner block until the burner tip (fuel nozzle tip) is a distance "L" from the hot face of the burner block. The swirling oxidant is introduced just upstream of the nozzle exit and the oxidant is mostly conveyed through a metallic burner body without cooling significant burner block length. It appears that the use of swirling oxidant is to introduce better mixing conditions with the fuel rather than altering flame characteristics in the radial dimension. Due to the fixed burner block geometry (cylindrical shape), flame characteristics such as the flame shape alteration in radial direction, cooling burner tips and block interior using oxidant flow, and cleaning burner block interior with sweeping oxidant stream are severely curtailed.

Therefore, there exists a need in the combustion art for a burner which solves some or all of the above problems with known burners.

SUMMARY OF THE INVENTION

In accordance with the present invention, burner apparatus and methods of use of same are provided which address many of the problems noted with previous designs.

A first aspect of the invention is a burner apparatus comprising:
 a) a burner block having a fuel conduit, the fuel conduit having an inlet and an outlet, the outlet of the fuel conduit opening into a substantially conical oxidant expansion chamber;
 b) the burner block further having a substantially annular oxidant passage, the fuel conduit positioned within the substantially annular oxidant passage;
 c) the substantially annular oxidant passage having an inlet end proximate the fuel inlet and an outlet proximate the fuel conduit outlet, and having positioned therein at least one swirler for creating a swirling oxidant flow;
 d) the substantially annular oxidant passage fluidly communicating at its outlet end with the substantially conical oxidant expansion chamber in the burner block, the substantially conical oxidant expansion chamber having an inlet diameter Ds and an outlet diameter Dc such that Dc is at least 110% of Ds;
 e) a substantially cylindrical combustion chamber having diameter Dc and having an inlet and an outlet, the outlet of the substantially conical oxidant expansion chamber positioned in fluid communication with the inlet of the substantially cylindrical combustion chamber, the outlet of the substantially cylindrical combustion chamber opening to a furnace chamber; and
 f) the outlet of the fuel conduit being recessed a distance Lr from the substantially cylindrical combustion chamber outlet, where Lr=Lc+Le, where Lc=length in axial direction of the substantially cylindrical combustion chamber, and Le=length in axial direction of the substantially conical oxidant expansion chamber.

Preferred burner apparatus of this aspect of the invention are those wherein the substantially conical oxidant expansion chamber has an expansion angle ranging from about 5° to about 60°, more preferably ranging from about 10° to about 30°, particularly preferably ranging from about 15° to about 25°. Further referred burner apparatus in accordance with the first aspect of he invention are those burner apparatus wherein the a least one swirler is a plurality of vanes each having a vane angle ranging from about 5° to about 30°, more preferably ranging from about 30° to about 60°. Also preferred are those burner apparatus in accordance with the first aspect of the invention wherein Le is about 10% to about 50% of Lr.

A second aspect of the invention is a burner apparatus comprising:
 a) a burner block having a fuel conduit, the fuel conduit having an inlet and an outlet, the outlet of the fuel conduit opening into a substantially conical oxidant expansion chamber;
 b) the burner block further having a substantially annular oxidant passage, the fuel conduit positioned within the substantially annular oxidant passage;
 c) the substantially annular oxidant passage having an inlet end proximate the fuel conduit inlet and an outlet proximate the fuel conduit outlet, and having positioned therein at least one swirler for creating a swirling oxidant flow;
 d) the substantially annular oxidant passage fluidly communicating at its outlet end with the substantially conical oxidant expansion chamber in the burner block, the substantially conical oxidant expansion chamber having an inlet diameter Ds and an outlet diameter Dc such that Dc is at least 110% of Ds;
 e) the outlet of the substantially conical oxidant expansion chamber positioned in fluid communication with a toroidal combustion chamber having an inlet and an outlet, the outlet of the toroidal combustion chamber opening to a furnace chamber, the toroidal combustion chamber having a radius of curvature R;
 f) the outlet of the fuel conduit being recessed a distance Lr from the torroidal combustion chamber outlet, where Lr=Lt+Le, where Lt=length in axial direction of the torroidal combustion chamber, and Le=length in axial direction of the substantially conical oxidant expansion chamber.

Preferred are burner apparatus in accordance with the second aspect of the invention wherein Le is about 10% to about 50% of Lr.

Burner apparatus in accordance with both burner apparatus aspects are those wherein the fuel conduit comprises a fuel nozzle having an inlet end and an outlet end, the nozzle positioned in the fuel conduit between the swirler and the outlet of the fuel conduit, the nozzle having a larger external diameter at its inlet end than at its outlet end.

A third aspect of the invention is a method of combustion of a fuel comprising:
 a) introducing a fuel and an oxidant into a burner block, the burner block being in accordance with the first aspect of the invention;
 b) forming a swirling oxidant as it passes through the swirler;
 c) flowing the swirling oxidant and the fuel into the substantially conical oxidant expansion chamber, the fuel flowing substantially near the axial center of the substantially conical oxidant expansion chamber, the swirling oxidant sweeping past a wall of the substantially conical oxidant expansion chamber;
 d) flowing the swirling oxidant and the fuel into the substantially cylindrical combustion chamber;
 e) combusting the fuel and oxidant in the substantially cylindrical combustion chamber while the oxidant sweeps past a wall of the substantially cylindrical combustion chamber; and
 f) flowing the combustion products into a furnace from the substantially cylindrical combustion chamber.

Preferred are those methods in accordance with the third aspect of the invention wherein the swirling oxidant expands as it passes through the substantially conical oxidant expansion chamber at an expansion rate dependent upon an expansion angle, where the expansion angle ranges from about 5° to about 60°, more preferably where the expansion angle ranges from about 10° to about 30°, particularly preferably wherein the expansion angle ranges from about 15° to about 25°. Also preferred are those methods in accordance with the third aspect of the invention wherein the fuel has a velocity less than or equal to 150 ft/sec, and the oxidant has a velocity less than or equal to 300 ft/sec.

A fourth aspect of the invention is a method of combustion of a fuel comprising:
 a) introducing a fuel and an oxidant into a burner block, the burner block designed in accordance with the second aspect of the invention;
 b) forming a swirling oxidant as it passes through the swirler;

c) flowing the swirling oxidant and the fuel into the substantially conical oxidant expansion chamber, the fuel flowing substantially near the axial center of the substantially conical oxidant expansion chamber, the swirling oxidant sweeping past a wall of the substantially conical oxidant expansion chamber;

d) flowing the swirling oxidant and the fuel into the substantially torroidal combustion chamber;

e) combusting the fuel and oxidant in the substantially torroidal combustion chamber while the oxidant sweeps past a wall of the substantially torroidal combustion chamber; and f) flowing the combustion products into a furnace from the substantially toroidal combustion chamber.

Preferred are those methods in accordance with the fourth aspect of the invention wherein the swirling oxidant expands as it passes through the substantially conical oxidant expansion chamber at an expansion rate dependent upon an expansion angle, where the expansion angle ranges from about 5° to about 60°, those methods wherein the fuel has a velocity less than or equal to 50 ft/sec, and those methods wherein the oxidant has a velocity less than or equal to 300 ft/sec.

As used herein the term "substantially conical oxidant expansion chamber" means a chamber having an inlet and an outlet, the outlet having greater diameter than the inlet, and the cross-section of the chamber being generally circular, although some oval and slot configurations are within the invention.

As used herein the term "substantially annular oxidant passage" means a region having an inlet and an outlet, a length dimension in the axial direction greater than the outside diameter defined by a cavity in the burner block, and an inside diameter defined by the external surface of the fuel conduit. While the substantially annular oxidant passage preferably has circular shape, viewed in cross-section taken through a plane perpendicular to the axial flow direction, the shape may be non-circular as well, generally dictated by the shape of the entrance to the substantially conical oxidant expansion chamber.

The term "swirler" indicates a component which, when placed in the path of flow of oxidant in the substantially annular oxidant passage, causes the oxidant to have a substantial radial flow component, while allowing substantial axial flow of oxidant therethrough. As a consequence, the term "swirling oxidant flow" is defined as a flow of oxidant having both a radial flow component and an axial flow component.

The phrase "substantially cylindrical combustion chamber" means a chamber which allows fluids to flow therethrough without substantial expansion in the axial direction. It is to be understood that there may be certain imperfections in the chamber, for example due to manufacturing procedures, that allow for some local expansion of gases. It is to be further understood that combustion chambers having circular, oval, or slot cross-sections may be referred to as "substantially cylindrical."

As used herein the term "substantially toroidal combustion chamber" means a chamber having an inlet and an outlet, the outlet having greater diameter than the inlet, and the cross-section of the chamber being generally circular, and the chamber wall having a radius of curvature, as generally depicted in FIG. 4 of this invention.

As used herein the term "oxidant" means an gas stream preferably having an oxygen concentration greater than the oxygen concentration of air at local conditions. Air may be used as the oxidant. In some particularly preferred embodiments, "oxidant" means a gas having greater than 50 percent oxygen concentration, and in some cases preferably greater than 90 percent oxygen.

The methods and apparatus of the invention provide an improved self-cooled oxy-fuel burner for creating the traditional (cylindrical) flame and flat flame depending on the heating load requirements. The novel features of the burner block include: a three compartment burner block having a swirl chamber, expansion chamber and combustion chamber. The key dimensionless ratios are:

Ls/Ds ranges from about 0.5 to about 5,

Le/Ds ranges from about 0.25 to about 3, where "s" indicates the swirl chamber,

Expansion angle ($\delta$) ranges form about 5° to about 60°,

Lc/Dc ranges from 0 to about 2 for the second burner embodiment, and ranges from about 1 to about 3 for the first burner embodiment, Rc/Dcl ranges from about 0.25 to about 2 in the second burner embodiment of the invention, where "c" indicates diameter of the substantially cylindrical combustion chamber, and "cl" indicates diameter of the substantially conical oxidant expansion chamber at its widest point, Swirl angle ($\beta$) ranges from about 5° to about 30° for the first burner embodiment, and from about 30° to about 60° for the second burner embodiment.

The fuel velocity is preferably less than 150 ft/sec for the burner and method of the first and third aspects of the invention, and less than 50 ft/sec for the flat flame produced by the burner and method of the second and fourth aspects of the invention. The oxidant velocities are less than 300 ft/sec, depending on the axial-tangential swirl configuration.

The specific flow geometry for fuel and oxidant streams in the various aspects of the invention provide active cooling and sweeping of the burner block interior for cooler operation and avoiding particulate inspiration.

The burners in accordance with the invention utilize a novel tip design. This design is novel in two respects, the first being aerodynamic shape, creating streamline mixing conditions for the swirling oxidant stream and the low velocity fuel stream, improving burner performance and avoiding hot spots and low pressure regions near the nozzle tip. The nozzle geometry of 5 to 7° external taper and straight internal fuel passage are essential parts of this shape. Secondly, a thermally efficient construction, achieved through a thicker fuel nozzle and conduction-convection heat dissipation modes using conduction fins.

The self-cooled burner apparatus of the present invention are preferred for use with oxidants having oxygen concentration greater than that of air. The inventive burners and nozzles can fire in high-temperature (2200° F. to 3000° F.) and high-particulate (or high process volatiles/condensates) furnaces without over-heating or causing chemical corrosion damage to it's metallic burner nozzle and refractory burner block interior. Using various embodiments of nozzle and block shape, the burner can offer a traditional cylindrical flame or flat flame depending on the heating load requirements. The new features of this burner include unique fuel nozzle design for the streamline mixing of fuel and oxidant streams, a controlled swirl input to the oxidant flow for desired flame characteristics, a controlled expansion of flame envelope in the radial and axial dimensions, and efficient sweeping of burner block interior surface using oxidant to provide convective cooling and prevent any build up of process particulates. In addition, a relatively thick wall metallic nozzle construction with conduction fins enable efficient heat dissipation from the nozzle tip and providing a maintenance free burner operation.

DESCRIPTION OF PREFERRED EMBODIMENTS

There are three key features in each embodiment of the inventive burner designs which can be implemented for improving operation in high particulate and high temperature furnaces. The three key features include:

1. A three compartment burner block design for creating a variable shape oxy-fuel flame and corresponding flame characteristics to improve flame-to-load heat transfer 2. A specific flow geometry for both fuel and oxidant streams to physically sweep the burner block interior and prevent buildup of particulates/volatiles in the burner block interior and burner tips 3. A novel tip design and tip construction for improved heat dissipation.

Figure 1:
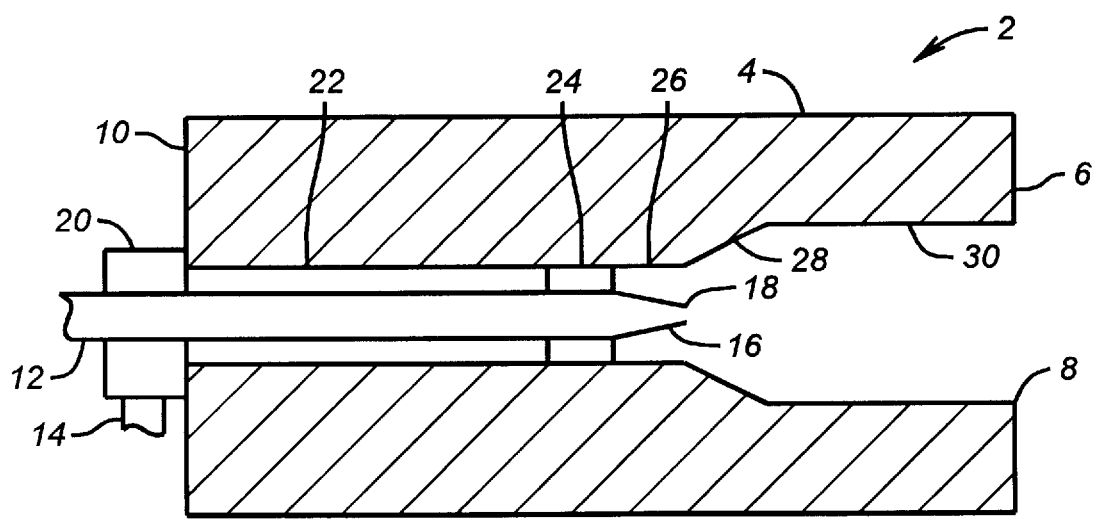
FIG. 1 is a cross-section, side elevation of a first burner embodiment.

Referring to the figures, FIG. 1 illustrates in cross-section, side elevation view the first burner embodiment 2 in accordance with the invention. In this embodiment, the burner apparatus comprises a burner block 4, preferably refractory in nature, having an end or hot face 6, an exit 8 for flame and hot combustion gases, and a cold end 10. A fuel conduit 12 and an oxidant conduit 14 are fluidly connected to cold end 10 of burner block 4. Fuel conduit 12, preferably a metallic pipe, has a nozzle 16 attached thereto terminating in a nozzle tip 18. Oxidant conduit 14 feeds an oxidant plenum 20, which is fluidly connected to cold end 10, thus allowing oxidant to enter a substantially annular oxidant passage 22. The oxidant travels through oxidant conduit 14, plenum 20, and through substantially annular oxidant passage 22, which surrounds the fuel conduit 12, on its way toward one or more oxidant swirlers 24. Oxidant is thus given an radial-tangential flow component as it passes axially through a swirl chamber 26, then is allowed to expand while still swirling as it passes axially through a substantially conical oxidant expansion chamber, 28. Completing the flow of oxidant, which begins to mix with the fuel, the oxidant travels in a swirling motion axially through a generally cylindrical combustion cavity 30, before exiting through exit 8. The degree of expansion in this embodiment is sufficient to impart rotation in the axial-tangential direction for obtaining a traditional flame. Oxidant swirlers 24 also affect the degree of tangential flow. A mostly tangential swirler arrangement is used to obtain a flat flame.

The flame is formed by using a relatively low velocity fuel stream (preferably ranging from about 5 ft/sec to about 150 ft/sec) and a swirling oxidant stream having various axial-tangential velocities (ranging from about 50 to about 300 ft/sec). The fuel velocity for forming a traditional flame shape is kept around 100 ft/sec or higher, whereas the production of a flat flame requires a lower fuel velocity, preferably ranging from about 5 to about 50 ft/sec. The oxidant stream is first developed of sufficient swirl strength and direction (tangential-axial or tangential) inside swirl chamber 26, and then it is allowed to expand in the radial direction using substantially conical oxidant expansion chamber 28 having a predetermined diverging geometry. Third, swirling oxidant is allowed to selectively or partially mix with the fuel stream inside the substantially cylindrical combustion cavity 30 of specific dimensions for combustion and developing a traditional shape swirling flame or for developing a flat flame using a specific curved geometry, as detailed herein. The above burner block sections for overall flame formation are described in detail in the following sections.

Figure 2:
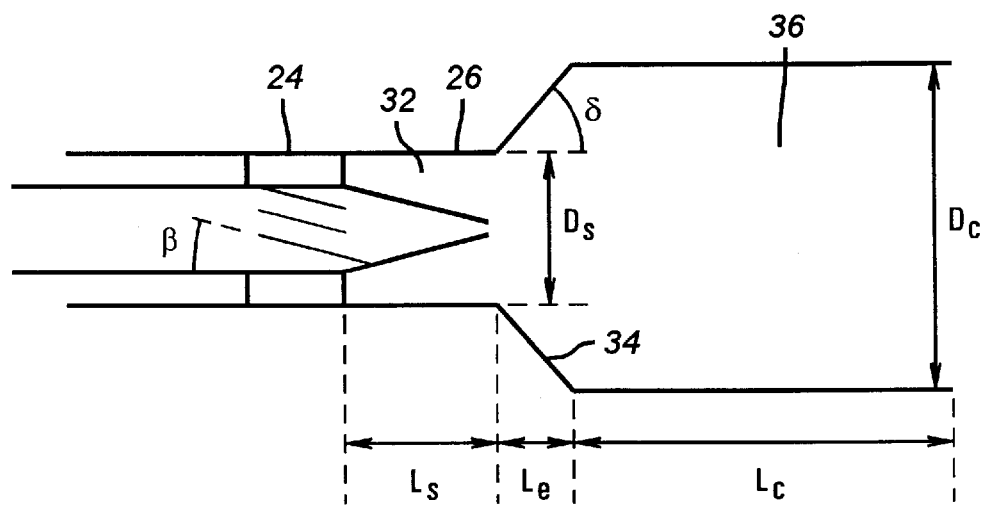
FIG. 2 is a schematic diagram indicating various dimensions of the first burner embodiment.

The three compartment burner block of the first aspect of the invention is illustrated schematically in FIG. 2 to describe the various dimensions. Each section of the burner block has a specific purpose in creating the optimum flame characteristics based on overall flame formation. Swirl chamber 26 has a swirl region 32. Swirl chamber 26 preferably has multiple (predetermined number of) guide vanes installed on the external surface of fuel nozzle 16 at a predetermined angle (alternatively one or more guide vanes can be inserted in the substantially annular oxidant passage 22 between fuel nozzle 16 and refractory burner block 4). The number of guide vanes 24 preferably varies between 4 and 16 depending on the overall diameter of the swirl chamber. Guide vanes 24 are preferably thin fins of metal welded to the external surface of fuel nozzle 16. The guide vanes angle β (with the flame axial axis) is in the range of 5° to 30° for developing traditional (cylindrical) flame. In very small size burners or systems designed to create a fuel-rich flame, the guide vanes may be machined in a relatively thick wall fuel nozzle. The annular section around the fuel nozzle and downstream of the guide vanes is denoted as the swirl chamber. It has specific dimensions for creating a swirling oxidant of required strength (swirl number) or required axial-tangential momentum. The first key dimensionless ratio is $L_s/D_s$ and it preferably ranges from about 0.5 to about 5. The length $L_s$ provides a distance in which the swirl generated by the oxidant swirler is fully developed in a constant diameter section. This section is preferably not extended beyond the ratio $(L_s/D_s)=5$; for values greater than 5 the already developed oxidant swirl will start becoming weak and begin loosing it's strength in the tangential-axial direction. This is due to wall friction inside the swirl chamber.

The second important feature illustrated in FIG. 2 is the substantially conical oxidant expansion chamber 28, which defines a region of expanding oxidant flow 34. This is a diverging section where the swirling oxidant stream is allowed to expand in the radial direction. The purpose is to radially expand the oxidant stream and maintain a controlled mixing condition with the fuel stream, as illustrated schematically in FIG. 3. If the expansion is not carried out, the swirling oxidant stream (based on the swirl strength) will intimately mix with the fuel stream and create a well-stirred mixture of fuel and oxidant. The combustion of such mixture is instantaneous due to relatively high reaction rates and will produce a very high temperature flame capable of melting most refractory burner blocks. In order to reduce the mixing ability of oxidant stream the expansion angle δ preferably ranges from about 5° to about 60°. The axial length $L_e$ of the expansion chamber is fixed at certain ratio $L_e/D_s$ ranging from about 0.25 to about 3. A larger length $L_e$ causes the swirling oxidant stream (and also the flame 38) to expand more in the radial direction (depending on the expansion angle δ) before mixing with the fuel stream. This is particularly used (with large expansion angles) for developing a flat flame. A smaller length $L_e$ will immediately allow oxidant stream to mix with the fuel stream, which may be useful for developing a more traditional shaped flame.

The substantially cylindrical combustion cavity 30 creates a combustion region 36 (FIG. 2). This is a final region for controlled mixing of both fuel and oxidant for the overall flame formation. The design of the substantially cylindrical combustion cavity 30 is to supplement the mixing of fuel and swirling oxidant that has already taken place in the substantially conical oxidant expansion chamber 28. The swirling oxidant stream is allowed to expand in the radial direction up to certain extent in substantially conical oxidant expansion chamber 28. The substantially cylindrical combustion cavity 30 is used to arrest the expansion process in the radial direction and create a flame 38 in region 36 based on mixing conditions. The combustion chamber dimensionless ratio $L_c/D_c$ (see FIG. 2) is selected based on the desired flame shape. Table I lists some basic flame types based on flame momentum and approximate range of $L_c/D_c$ ratio. These numbers are based on cumulative experimental data and computational studies at various firing rates.

TABLE I

Flame types

| Traditional Flame Type | $L_c/D_c$ |
|---|---|
| Short (High Momentum) | 1–3 |
| Long (Low Momentum) | 0 to 2 |

Turning now to the second aspect of the invention, the combustion chamber design for flat flame formation is somewhat different compared to traditional (cylindrical) flame. The flat flame is formed due to the "coanda" effect and using a curved geometry in the combustion chamber exit as illustrated by the burner apparatus 50 in FIG. 4. Here, the substantially conical oxidant expansion chamber 28 is extended into the combustion chamber using radius $R_c$ tangent to the diverging section of expansion chamber. The ratio $R_c/D_{cl}$ ranges from about 0.25 to about 2. A smaller ratio for the radius $R_c$ is used for smaller size burners and larger ratio is used for larger size burners.

Figure 4:
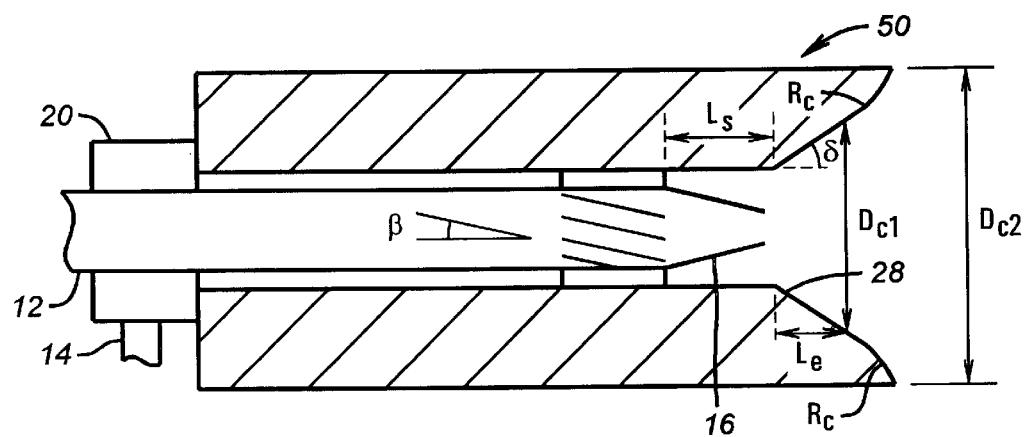
FIG. 4 is a cross-section, side elevation of a second burner embodiment, indicating various dimensions.

The gradual divergence in the radial direction in the burner apparatus illustrated in FIG. 4 is necessary to sustain the flame rotation in the ever expanding radial direction and enable the flame to develop in the flat shape structure. The swirler angle (guide vanes angle β with respect to flame axis) for the production of a flat flame is also kept relatively high, preferably ranging from about 30° to about 60°. The flat flame is found to hug the substantially conical oxidant expansion chamber wall and subsequently the furnace wall due to the coanda effect. The rotating flame of relatively large diameter near the hot face of burner block provides the radiative heat flux to the load.

Figure 3:
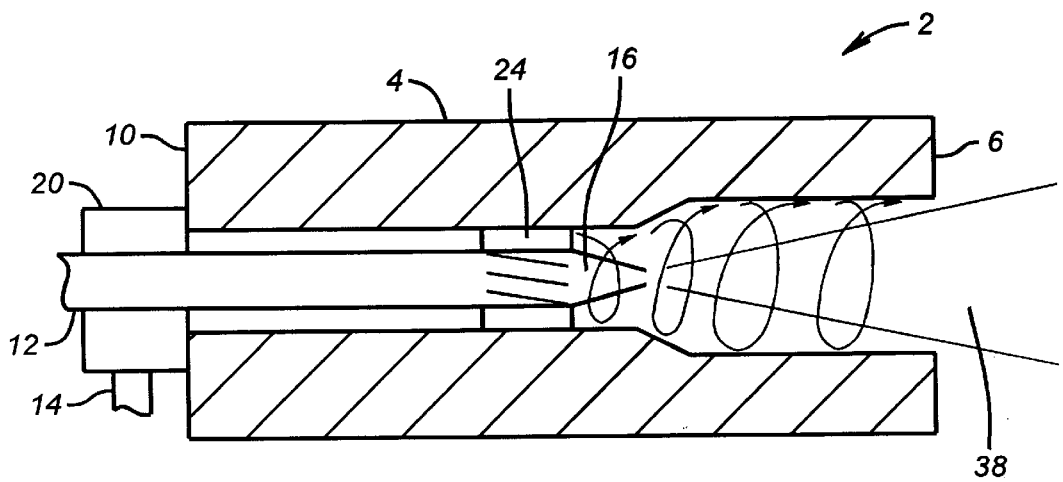
FIG. 3 is a cross-section, side elevation, partially schematic view of the first burner embodiment, indicating swirling oxidant.

The combustion chamber design and especially various dimensions, dimensionless ratios and angles are selected such that there is always a film of relatively cool oxidant near the inner wall of the substantially conical oxidant expansion chamber and the portions of the burner apparatus downstream thereof. A primary objective of the burner apparatus and methods of the invention is to maintain a film of rotating oxidant to remain close to the wall inner surface all along the flame path. This is illustrated in FIG. 3 for the first burner apparatus of the invention.

A specific flow geometry for the fuel and swirling oxidant streams is suggested so that the mixing between fuel and oxidant is carefully controlled to offer a variable flame shape burner performance. A traditional cylindrical flame or flat flame can be obtained by simply changing the burner tips and burner block internal geometry. In many cases a refractory insert of required internal geometry can be inserted in the existing burner block to alter burner block internal geometry. This would prevent a long interruption in the heating process. The overall goal is accomplished with uniform heat-flux to the heating load and without excessive flame temperatures or overheating of burner parts. In furnaces which contain high concentrations of process particulate matter or volatile species, this concept of active sweeping of burner block interior is very important, otherwise material buildup within the burner block can occur. Under some flow conditions especially at high firing rates, low pressure regions or recirculation zones may develop, particulates from the furnace atmosphere may entrain inside the combustion chamber and deposit particulate matter. If active sweeping is not carried out, the accumulation of particulates can occur and it can have an adverse affect on the overall flame fluid dynamics. It is not uncommon for the flame to be deflected, impinging on the interior refractory surface of the block and resulting in catastrophic block failure. The schematic in FIG. 3 illustrates the active burner block cooling and particulate sweeping process.

The condensation of volatile species on the burner nozzle tip can also occur without active sweeping of the burner block under the certain conditions. Condensed salts can react with metallic nozzle tips. In the event of chemical reaction, accelerated corrosion can result in the premature failure. The condensed salts can also build up layer after layer on the nozzle tip causing flow restrictions or flame deflections. Again, catastrophic failure of the block can occur.

Figure 5:
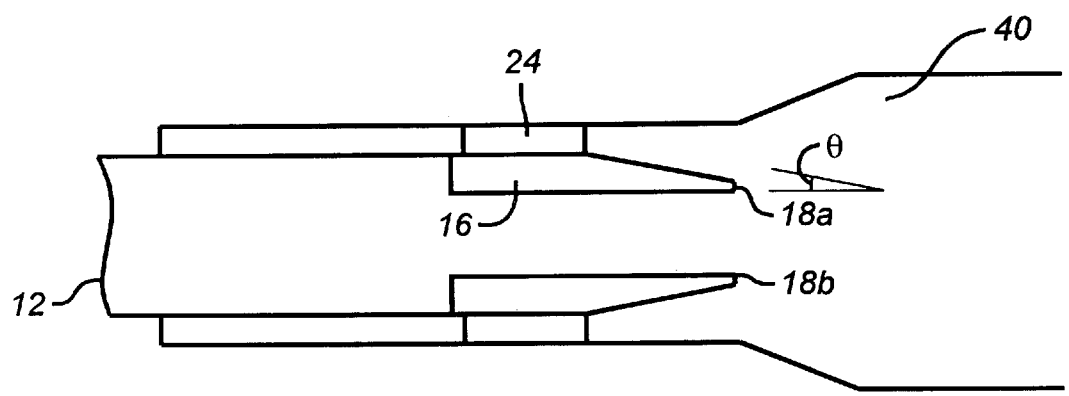
FIG. 5 is a schematic diagram of a fuel nozzle in accordance with the invention.
Figure 6:
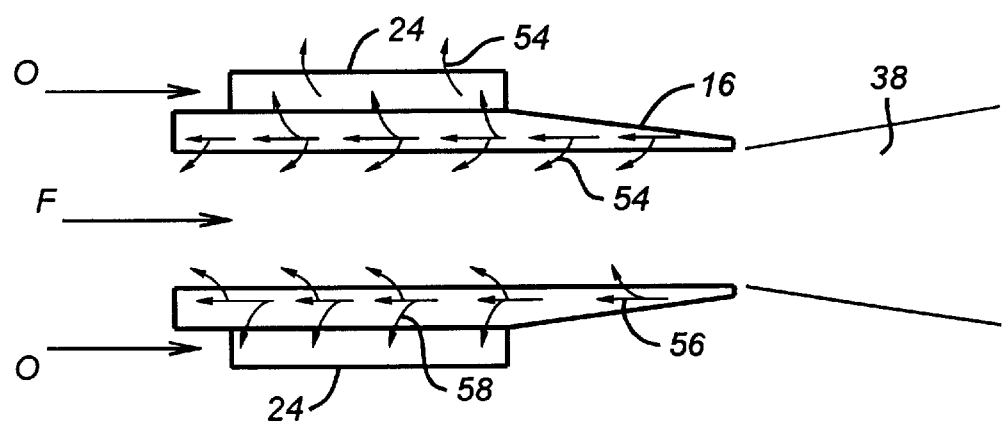
FIG. 6 is a second schematic of the nozzle of FIG. 5, indicating the heat transfer effects inherent in the design.

In traditional (pipe-in-pipe) burner design, the natural gas nozzle is typically farther advanced toward the hot zone to prevent significant flame formation in the burner block. Even in low particulate applications, this arrangement can produce accelerated corrosion of the nozzle. This corrosion can occur even on exotic materials such as Inconel 600 and PM 2000 alloys. Two different corrosion mechanisms have been identified. On the inside of the nozzle exposed to natural gas a severe metal dusting can occur, especially with Inconel 600 alloy. On the outside of the nozzle, pitting and chromium depletion can take place. In order to counter these problems, a novel nozzle has been designed having two distinct design features.

a) Aerodynamic Shape: The fuel nozzle internal and external geometry is optimized for aerodynamic mixing of fuel and oxidant streams. This is illustrated schematically in FIG. 5. As illustrated in FIG. 5, the swirling oxidant stream (in axial-tangential direction) is allowed to mix with the fuel stream in a gradual and aerodynamic manner without sharp intersection of two fluid streams. The external angle on the fuel nozzle, θ, is fixed at a value ranging only from about 5° to 7°. This design avoids flow separation in the swirling oxidant stream. The boundary-layer theory for a turbulent jet indicates that at gas flow angles greater than 7°, there is a possibility of flow separation. A separated oxidant flow results in recirculation regions and a low-pressure region in the stagnation region (18a and 18b) of the fuel nozzle 16. Turbulent eddies in the recirculation regions can cause accelerated mixing between fuel and oxidant streams and formation of the hot-spot. In some cases, these hot spots can form soot or invite process particulates (ie from the load being heated) to deposit on the fuel nozzle tip due to the stagnation regions 18a, 18b.

b) Thermally Efficient Construction: The fuel nozzle construction 16 is such that it can take advantage of both "conductive" and "convective" heat transfer mechanisms for efficient heat dissipation. The high heat conduction design is achieved by using relatively thicker nozzle construction. In general operation, the flame produced by the inventive burner apparatus and methods of the invention is anchored to the nozzle tip. Therefore, the nozzle tip should be capable of conducting heat away from the concentrated tip region and transfer it to some distance upstream of the fuel nozzle (towards the fuel supply). As illustrated in FIG. 6, fuel flow "F" and oxidant flow "O" flow from upstream to downstream, left to right in FIG. 6. Thicker nozzle 16 allows this "axial conduction" mode, as depicted by the arrows 56. The transferred heat is then picked up by the flowing fuel and oxidant streams (on both sides of the nozzle) using forced convection heat transfer, depicted as 54. In short, the relatively thicker tip allows efficient transfer of heat using axial conduction 56 and then effective forced convection 54. The forced convection modes are due to flowing fuel stream and flowing (swirling) oxidant streams. In addition, the guide vanes 24 used for the swirling oxidant also act as "heat conduction fins" and conductively transfer the heat (58) to annular swirling oxidant streams quite effectively. Depending on the number of fins (preferably about 4 to about 16) the heat conduction and then forced convective heat transfer efficiency can be improved quite significantly. It was shown during the various experimental tests that the nozzle temperature was reduced from 1000° F. to 300° F. using above tip construction at a same firing rate and using similar geometry for other burner design parameters.

The novel nozzles of the present invention are preferably used with a standard threaded connection to the fuel conduit for easy nozzle replacement or for changing nozzles for different firing rate considerations.

A numerical simulation of the burner described in the first embodiment has been performed, using the FLUENT/UNS computational fluid dynamics computer program. The domain used was a 2D axisymmetric field with swirl. The physical models employed include the PDF model for combustion, the RNG k-epsilon model for turbulence and the P1 model to account for the effects of radiative heat transfer. The natural gas flowrate considered was 2,300 scfh, and the oxygen flow rate was 4,900 scfh. The virtual walls of the combustion space were considered to be adiabatic, and conductive heat transfer through the block wall was taken into account. For comparison, two different cases have been investigated: the base case without swirl, and the second case including a swirl angle β of 20° for the oxygen flow only.

Figure 7A:
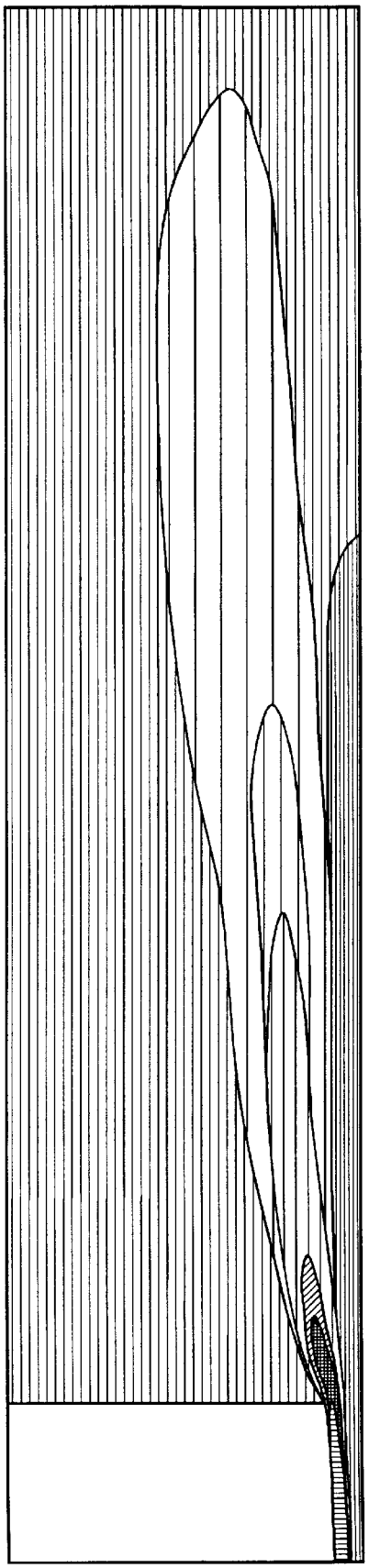
FIGS. 7a and 7b are data of a flame modeling program of the first burner embodiment, with and without swirling oxidant, respectively.
Figure 7B:
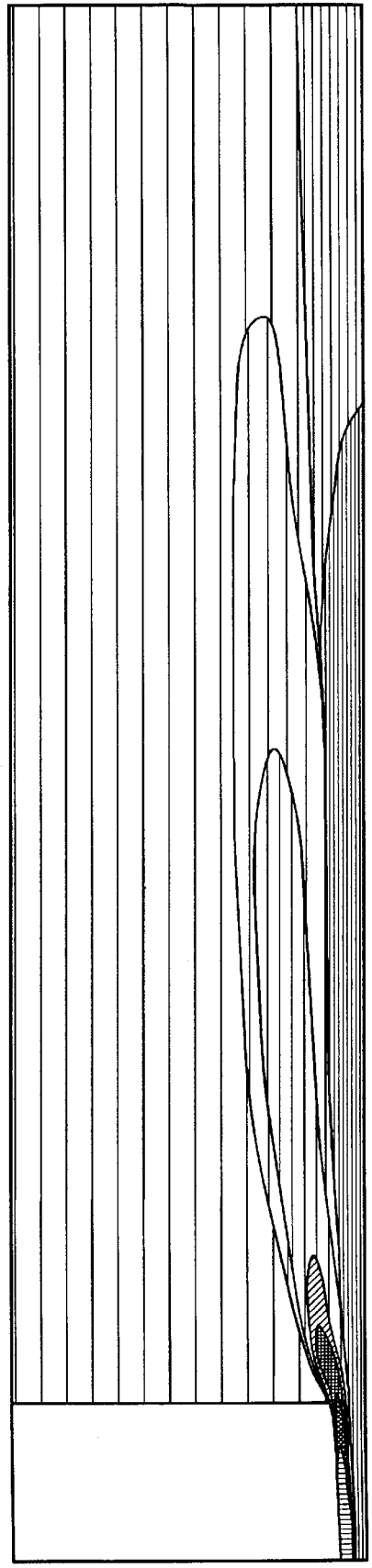

FIGS. 7a and 7b illustrate the oxygen profile in the two cases, FIG. 7a for the non-swirled flow, and FIG. 7b for the flow with swirl, for a burner constructed in accordance with FIG. 1. The results show that the swirl has an important effect in restricting the dispersion of oxygen radially, concentrating most oxygen closer to the burner axis. These patterns are attributed to the differences in the oxygen momentum, and the implications of these patterns on burner operation are discussed in reference to FIGS. 8a and 8b.

Figure 8A:
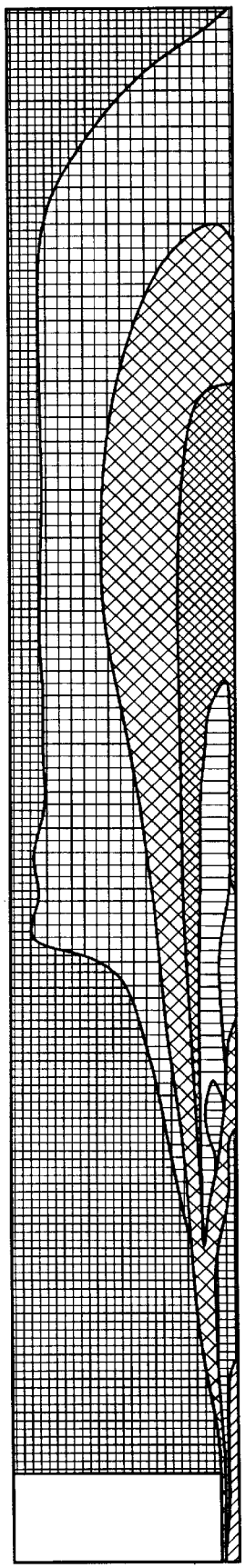
FIGS. 8a and 8b are data of a flame modeling program of the second burner embodiment with and without swirling oxidant, respectively.
Figure 8B:
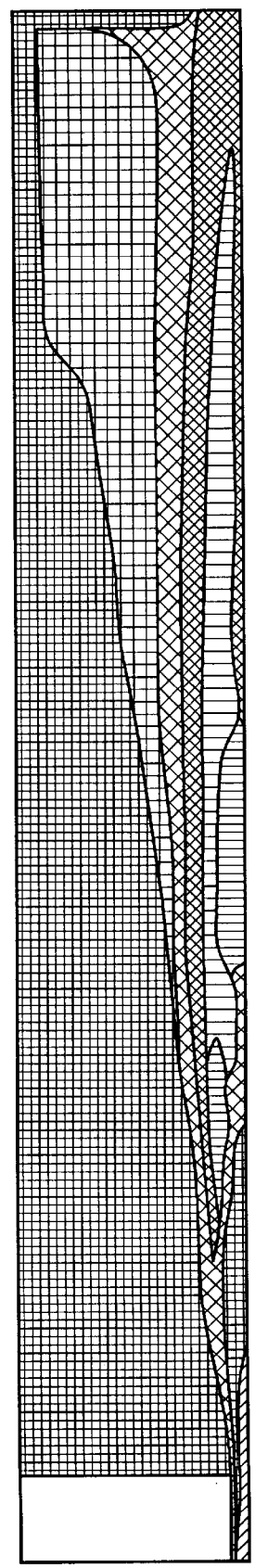

FIGS. 8a and 8b show the temperature profiles for the case without swirl (FIG. 8a), and with swirl (FIG. 8b), respectively, again for a burner constructed in accordance with FIG. 1. The temperature profiles show that the case with swirl in FIG. 8b leads to a longer flame, significantly more concentrated toward the burner axis, when compared to the "lazier" flame in the case without swirl (FIG. 8a). The flame in the case without swirl tends to disperse radially towards the load (downward) and the wall (upward) surfaces. This difference in temperature distribution is very important for various industrial applications such as glass production. Thus, the introduction of swirl results in lower temperatures at both the molten glass surface, and the furnace walls, as observed in FIGS. 8a and 8b. This patterns leads to lower emissions from the molten glass, a very important feature for the inventive burner, as well as lower wear on the furnace crown. The temperature distributions illustrated in FIGS. 8a and 8b also that the more direct flame of the swirled flow results in a decreased temperature profile into the burner block. This is another important parameter of the inventive burners, given the high temperatures experienced in commercial glass furnaces, which can drastically reduce burner life, and consequent effects on furnace efficiency. Additionally, the swirled flow possesses a larger momentum for the oxygen flow, leading to an improved convective cooling of the burner tip and the burner block, with lower average temperatures when compared to the flow without swirl. In the cases presented here, the average oxygen momentum for the swirled flow is about 10% higher than the case without swirl. This factor, combined with the centrifugal force provided by the tangential component of velocity, leads to an improved flow next to the walls of the burner block, consequently to a higher convective heat transfer coefficient. Thus, the case without swirl leads to a higher temperature profile in the burner block outlet, with temperatures up to 110° F. higher than the case with swirl.

FIGS. 7a, 7b, 8a, and 8b also illustrate that a non-constant diameter, initially expanded combustion chamber, followed by a substantially cylindrical combustion chamber geometry, positively affects the maintenance of oxidant swirl due to less wall friction. If a swirling fluid stream is not allowed to develop in the swirl chamber, and then expand in the radial direction, the intensity of swirl quickly dies due to wall friction effects. On the other hand, in a constant diameter combustion chamber, the swirling oxidant reacts too quickly with the fuel due to the close proximity in the combustion chamber, creating a short, intense flame. The cooling of the burner block is also positively affected by having an expansion region, due to the slower burnout of swirling oxidant in a relatively wider diameter combustion chamber.

After several laboratory tests of a burner constructed in accordance with FIGS. 1 and 2 additional tests were carried out in a furnace used for producing borosilicate wool insulation (fiberglass). The 740 square feet melt area furnace capacity was about 150 tons/day and it used 10 pipe-in-pipe type conventional oxy-fuel burners known under the trade designation ALGLASS™, available from Air Liquide America Corporation, Houston, Tex. The firing rate of the furnace was about 19 MM Btu/hr. The conventional burners required weekly cleaning due to high level of particulate, condensates and volatiles in the furnace. The burner nozzle and burner blocks required periodic cleaning. The customer agreed to a limited field trial using one improved burner of this invention rated at 500 kW at mid-length location. The objectives were to reduce the maintenance/cleaning requirements using the new burner. The conventional burner was pulled out and the new burner and burner block (as illustrated schematically in FIGS. 1 and 2) were installed. The burner and block particulars are as following:

Velocity (oxidant)=22 to 75 ft/sec;
Velocity (fuel)=40 to 130 ft/sec;
Lc/Dc=1.78;
Dc=3.38 inches;
Le=15% of the total combustion chamber length Lt, where Lt=Le+Lc.;
Ds=2.2 inches;
Lc=5.9 inches; Ls=2 inches; Le=1.06 inches; and swirl angle β=10°.

The burner was fired at average firing rate of 2.3 MM Btu/hr and it produced average flame length of 8 feet and flame width of about 20 inches. The flame was very luminous (more than the conventional burner known under the trade designation ALGLASS™) and it was much wider. The inside block temperatures were lower (as measured by an optical pyrometer) due to the cooling/sweeping action of oxidant. The burner nozzle was even cooler (200 to 300° F. after long-term firing). After several weeks of continuous operation, the inventive burner was pulled out for inspection. It was found very clean and did not require any cleaning. The burner block cavity was also very clean. A decision was taken with the customer to retrofit the entire furnace (10 burners) with the inventive burners. After 9 months of continuous operation, the new burners had not required regular cleaning.

This various aspects of the invention have been described with many advantages in mind, but certainly those skilled in the art will conceive of insubstantial variations and modifications to the burner apparatus and methods described herein, which are to be considered laying within the fair boundaries of the appended claims.

What is claimed is:

1. A burner apparatus comprising:
  a) a burner block having a fuel conduit, the fuel conduit having an inlet and an outlet, the outlet of the fuel conduit opening into a substantially conical oxidant expansion chamber;
  b) the burner block further having a substantially annular oxidant passage, the fuel conduit positioned within the substantially annular oxidant passage;
  c) the substantially annular oxidant passage having an inlet end proximate the fuel conduit inlet and an outlet end proximate the fuel conduit outlet, and having positioned therein at least one swirler for creating a swirling oxidant flow;
  d) the substantially annular oxidant passage fluidly communicating at its outlet end with the substantially conical oxidant expansion chamber in the burner block, the substantially conical oxidant expansion chamber having an inlet diameter Ds and an outlet diameter Dc such that Dc is at least 110% of Ds;
  e) the outlet of the substantially conical oxidant expansion chamber positioned in fluid communication with a toroidal combustion chamber having an inlet and an outlet, the outlet of the toroidal combustion chamber opening to a furnace chamber, the toroidal combustion chamber having a radius of curvature R;
  f) the outlet of the fuel conduit being recessed a distance Lr from the toroidal combustion chamber outlet, where Lr=Lt+Le, where Lt=length in axial direction of the toroidal combustion chamber, and Le =length in axial direction of the substantially conical oxidant expansion chamber; and
  g) wherein Le is about 10% to about 50% of Lr.

2. Method of combustion of a fuel comprising:
  a) introducing a fuel and an oxidant into a burner block, the burner block having a fuel conduit, the fuel conduit having an inlet and an outlet, the outlet of the fuel conduit opening into a substantially conical oxidant expansion chamber, the burner block further having a substantially annular oxidant passage, the fuel conduit positioned within the substantially annular oxidant passage, the substantially annular oxidant passage having an inlet end proximate the fuel inlet and an outlet end proximate the fuel conduit outlet, and having positioned therein at least one swirler for creating a swirling oxidant flow, the substantially annular oxidant passage fluidly communicating at its outlet end with the substantially conical oxidant expansion chamber in the burner block, the substantially conical oxidant expansion chamber having an inlet diameter Ds and an outlet diameter Dc such that Dc is at least 110% of Ds, the outlet of the substantially conical oxidant expansion chamber positioned in fluid communication with a toroidal combustion chamber having an inlet and an outlet, the outlet of the toroidal combustion chamber opening to a furnace chamber, the toroidal combustion chamber having a radius of curvature R, the outlet of the fuel conduit being recessed a distance Lr from the toroidal combustion chamber outlet, where Lr=Lt+Le, where Lt=length in axial direction of the toroidal combustion chamber, and Le=length in axial direction of the substantially conical oxidant expansion chamber;
  b) forming a swirling oxidant as it passes through the swirler;
  c) flowing the swirling oxidant and the fuel into the substantially conical oxidant expansion chamber, the fuel flowing substantially near the axial center of the substantially conical oxidant expansion chamber, the swirling oxidant sweeping past a wall of the substantially conical oxidant expansion chamber;
  d) flowing the swirling oxidant and the fuel into the substantially toroidal combustion chamber;
  e) combusting the fuel and oxidant in the substantially toroidal combustion chamber while the oxidant sweeps past a wall of the substantially toroidal combustion chamber;
  f) flowing the combustion products into a furnace from the substantially toroidal combustion chamber; and
  g) wherein the fuel has a velocity less than or equal to 50 ft/sec.

3. Method in accordance with claim 2 wherein the swirling oxidant expands as it passes through the substantially conical oxidant expansion chamber at an expansion rate dependent upon an expansion angle, where the expansion angle ranges from about 5° to about 60°.

4. Method of combustion of a fuel comprising:
  a) introducing a fuel and an oxidant into a burner block, the burner block having a fuel conduit, the fuel conduit having an inlet and an outlet, the outlet of the fuel conduit opening into a substantially conical oxidant expansion chamber, the burner block further having a substantially annular oxidant passage, the fuel conduit positioned within the substantially annular oxidant passage, the substantially annular oxidant passage having an inlet end proximate the fuel inlet and an outlet end proximate the fuel conduit outlet, and having positioned therein at least one swirler for creating a swirling oxidant flow, the substantially annular oxidant passage fluidly communicating at its outlet end with the substantially conical oxidant expansion chamber in the burner block, the substantially conical oxidant expansion chamber having an inlet diameter Ds and an outlet diameter Dc such that Dc is at least 110% of Ds, the outlet of the substantially conical oxidant expansion chamber positioned in fluid communication with a toroidal combustion chamber having an inlet and an outlet, the outlet of the toroidal combustion chamber opening to a furnace chamber, the toroidal combustion chamber having a radius of curvature R, the outlet of the fuel conduit being recessed a distance Lr from the toroidal combustion chamber outlet, where Lr=Lt+Le, where Lt=length in axial direction of the toroidal combustion chamber, and Le=length in axial direction of the substantially conical oxidant expansion chamber;

b) forming a swirling oxidant as it passes through the swirler;

c) flowing the swirling oxidant and the fuel into the substantially conical oxidant expansion chamber, the fuel flowing substantially near the axial center of the substantially conical oxidant expansion chamber, the swirling oxidant sweeping past a wall of the substantially conical oxidant expansion chamber;

d) flowing the swirling oxidant and the fuel into the substantially toroidal combustion chamber;

e) combusting the fuel and oxidant in the substantially toroidal combustion chamber while the oxidant sweeps past a wall of the substantially toroidal combustion chamber;

f) flowing the combustion products into a furnace from the substantially toroidal combustion chamber; and g) wherein the oxidant has a velocity less than or equal to 300 ft/sec.

5. Method in accordance with claim 4 wherein the swirling oxidant expands as it passes through the substantially conical oxidant expansion chamber at an expansion rate dependent upon an expansion angle, where the expansion angle ranges from about 5° to about 60°.

* * * * *